(12) United States Patent
Pudipeddi et al.

(10) Patent No.: US 7,844,606 B2
(45) Date of Patent: Nov. 30, 2010

(54) LEGACY FILTER SUPPORT IN A NEW MANAGED FILE SYSTEM FILTER MODEL

(75) Inventors: Ravisankar V. Pudipeddi, Sammamish, WA (US); Brian K. Dewey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 38 days.

(21) Appl. No.: 10/700,729

(22) Filed: Nov. 4, 2003

(65) Prior Publication Data

US 2005/0097143 A1    May 5, 2005

(51) Int. Cl.
  *G06F 17/30* (2006.01)
(52) U.S. Cl. ........................ 707/736; 707/754
(58) Field of Classification Search ............ 707/1, 707/7, 10
  See application file for complete search history.

(56) References Cited

U.S. PATENT DOCUMENTS

| | | | |
|---|---|---|---|
| 5,845,293 A | 12/1998 | Veghte et al. | |
| 5,897,640 A | 4/1999 | Veghte et al. | |
| 6,477,544 B1 | 11/2002 | Bolosky et al. | |
| 6,549,918 B1 | 4/2003 | Probert, Jr. et al. | |
| 6,728,716 B1 | 4/2004 | Bhattacharya et al. | |
| 2001/0020245 A1* | 9/2001 | Golds et al. | 709/102 |

OTHER PUBLICATIONS

R. Coster and M. Svensson. Inverted File Search Algorithms for Collaborative Filtering. Proceedings of the 25th Annual international ACM conference on Research and Development in information retrieval, pp. 246-252, 2002.

* cited by examiner

*Primary Examiner*—Baoquoc To
(74) *Attorney, Agent, or Firm*—Wolf, Greenfield & Sacks, P.C.

(57) ABSTRACT

Systems and methods are described that facilitate management of file system filters, comprising a filter manager that maps altitudes of minifilters to legacy filter order groups. An aspect of the present invention provides for minifilters that can dynamically load and unload, thus facilitating increased flexibility in filter system management.

19 Claims, 9 Drawing Sheets

LEGACY FILTER SUPPORT IN A NEW MANAGED FILE SYSTEM FILTER MODEL

TECHNICAL FIELD

This invention relates generally to computer systems, and more particularly to systems and methods that facilitate ordering of file systems and file system filters.

BACKGROUND OF THE INVENTION

Extant file system management models are limited in that the order in which a filter loads dictates the order in which the filter attaches to a critical volume. Such systems are inflexible with respect to variation in the ordering of filters. For example, an operating system will notify a filter that registers for such notifications, that there is a file system loading. A file system creates a device object as it loads, and the file system provides information to the file manager regarding the contents of the file system.

Traditional systems require that filters attach to a critical volume in the order in which they load. Legacy filters do not have dynamic loading capabilities, but rather must load as load-order groups (antivirus, encryption, quota, etc.). Such filters are typically layered from top to bottom. For example, legacy filters must load at a predetermined time in accordance with an associated start-type, which results in inflexibility of the filter system. Conventional start-types can be, for instance, "boot," whereby a filter or driver is loaded at start-up; "system," which denotes that a file system is already loaded, and that a next phase of drivers is incoming; "auto," whereby drivers are automatically loaded before login; "manual," whereby a user must explicitly start the driver; and "disable," which describes a driver that does not load or start. Legacy filters have specific start-types assigned to them, and, thus, can determine when they boot relative to each other. For example, if a legacy filter L1 has associated with it a "boot" start-type and filter L2 has associated with it a "system" start-type, L1 will load first. Depending on the function of the filters, this can be problematic in that it can unnecessarily increase the time required to perform a given function. For instance, it is often desirable to load an encryption filter before loading an antivirus filter. However, if the start-types dictate that an antivirus filter loads prior to an encryption filter, ineffectiveness is inevitable. Such ineffectiveness occurs because the antivirus filter in this case only sees encrypted I/O, and, therefore, cannot detect viruses. Furthermore, the loading order of two filters in the same load order group and having the same start-type (e.g., "boot") cannot be predicted or guaranteed, thus further increasing inefficiency and the potential for undesirable loading sequences.

Software modules such as file system filter drivers can be stacked or otherwise arranged linearly (e.g., chained), and perform their operations in the order in which they are stacked. For example, in the Windows® 2000 operating system, file system filter drivers are stacked into a driver stack where they are able to intercept file system-directed requests and responses to and from a base file system (such as FAT or NTFS). In this manner, the drivers can, for example, scan file data for viruses, enforce disk usage quotas, encrypt data, and perform other similar functions.

While it is often useful to run more than one such filter driver for each file storage volume of a computer system, these filters are written by a number of vendors, and software bugs often result from interoperability issues between the various filters. Testing has discovered that such bugs often depend on the order in which drivers are loaded and/or attached to the filter driver stack. Additionally, certain combinations of filters can only work properly when attached in a certain order. For example, to be effective, an antivirus filter, which reads the contents of a file to look for viruses, needs to see the data before the data is scrambled by an encryption filter.

Contemporary operating systems, such as Microsoft Corporation's Windows® XP operating system, with an underlying file system such as the Windows® NTFS (Windows® NT File System), FAT, CDFS, SMB redirector filesystem, or WebDav file systems, permit one or more file system filter drivers to be inserted between the I/O manager that receives user I/O requests and the file system driver. In general, filter drivers ('filters') are kernel-mode drivers that enhance the underlying file system by performing various file-related computing tasks that users desire, including tasks such as passing file system I/O (requests and data) through anti-virus software, file system quota providers, file replicators and encryption/compression products. For example, antivirus products provide a filter that watches I/O to and from certain file types (.exe, .doc, etc.) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, removal of the components without necessitating the changing the actual operating system or file system driver code.

The existing file system filter model in contemporary Windows®-based operating systems (e.g., Windows® NT, Windows® 2000, Windows® XP, Windows® .NET Server 2003) leverages the inherent I/O model, which is a packet-based approach. To this end, file system filters load as regular drivers in a stack and attach to the underlying file system's volume device objects. User I/O requests are converted by an I/O manager into I/O Request Packets (IRPs), which are sent to the driver stack and processed by the top driver, which can complete it, pass it down in a call to another driver towards the file system, which in turn calls the next lower driver, and so on. In general, each driver does whatever processing it is coded to perform on the IRP, and then explicitly passes down the IRP to the next lower driver (or file system if none are lower), or completes (or fails) the IRP and sends it back up the stack to the next higher driver (or the I/O manager if none are higher).

Another problem is efficiency, as file system filters traditionally receive and process every operation that normally goes to a file system, even those in which they have no interest. For example, an antivirus product can slow down a system as much as sixty percent, but not every I/O request received by an antivirus filter is one upon which the filter will act (e.g., inspect corresponding data for viruses). Redundancy is also a problem that leads to inefficiency and computing cost, as many filters perform similar functions in different manners, leading to unnecessary code.

Interoperability between drivers is also a significant problem, as, for example, one driver can modify I/O in a way that another driver does not anticipate and cannot properly deal with. Note that interoperability problems are one of the biggest drawbacks of the existing model, in part because filters have only limited control over ordering of attachment to a file system.

Other problems include overflowing stack space, because when two or more filters are installed, stack overflows are common due to recursive reentrant I/O issued by filters. Deadlocks are also common in the existing model, again primarily due to re-entrant I/O. Further problems include the inability to dynamically load and unload filters in the stack without a system reboot.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One aspect of the present invention described herein comprises a filter manager that allows coexistence between legacy filters that are already part of a file system and newer filters, thereby facilitating management of the priority and/or ordering of such filters and their execution. The filter manager infrastructure can mitigate the necessity for developers of the legacy filters to perform substantial modification on the filters because the management infrastructure seamlessly allows them to coexist with new filters. This invention permits the filter manager to insert newer "minifilters" between other filters to create a new framework. Working within a legacy filter framework, minifilters can be moved as desired. Moreover, minifilters can dynamically change their own position as desired. Thus, present invention advantageously enhances the ability of a filter manager to sort incoming requests.

According to a related aspect of the invention, a filter manager maps the "altitude" of minifilters within the framework of a legacy structure. An altitude can be a number that represents a priority setting relative to another altitude, and, collectively, assigned altitudes of minifilters define their full order. The altitudes leverage load-order groups to ensure that the order between the minifilters and legacy filters relative to each other is maintained, such that complete ordering is always present between minifilters. For example, each minifilter driver instance can be associated with an altitude that indicates where the driver is located in the callback order. The altitude can be pre-defined or derived from flags provide by the driver that indicate the type of processing the driver will perform on the callback data.

According to another aspect, altitude values are unique, such that no two altitudes have the same value. Unique altitude values enhance the ability of a filter to attach to a critical volume, such that the ordering of a filter occurs with respect to the ordering of attachment to a critical volume. This aspect further facilitates organization of filters according to their assigned altitudes, thereby mitigating the need for an organization schema relegated to ordering filters based on the order in which they load. For example, a filter manager can load first, and attach, followed by loading of a minifilter(s). Legacy filters can then load and attach directly, but the minifilters need not directly attach when they load.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
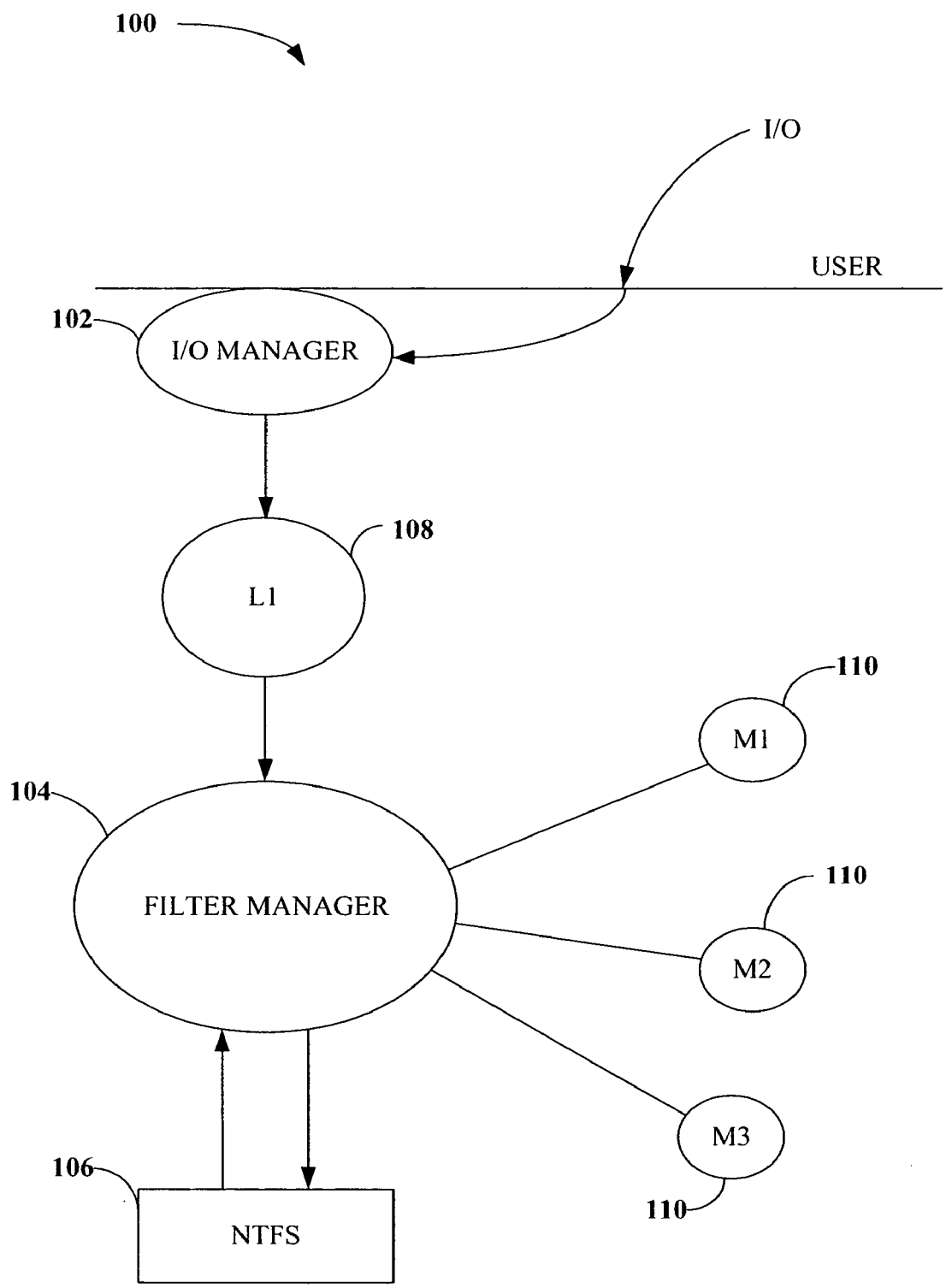
FIG. 1 is an illustration of a system in accordance with an aspect of the present invention, wherein legacy filters and minifilters coexist.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The following terms are used throughout the description, the definitions of which are provided herein to assist in understanding various aspects of the subject invention.

File system filters are drivers that enhance the underlying file system of an operating system. Examples of commercial products that feature a file system filter are antivirus software, file system quota providers, file replicators, and encryption/compression products.

A legacy filter is an extant filter driver in a file system. The terms "legacy" and "load order" are used interchangeably herein and describe a typical file system filter whose position in a given stack is subject to the constraints of the order in which it loads and/or, more particularly, the order in which it attaches.

A minifilter is a filter that has an "altitude" associated with it, which defines its position in a stack with regard to the position of one or more legacy filters. The altitude of a minifilter can be a unique numerical value.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. It is to be appreciated that filters, minifilters, filter managers, classifiers, models, order groups and other various items are components.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 is an illustration of a system 100 in accordance with an aspect of the present invention. The system 100 comprises an Input/Output (I/O) manager 102 operably coupled to a filter manager 104. The I/O manager converts user I/O requests into I/O request packets (IRPs) that are sent through a filter stack to be acted upon. The filter manager 104 is further operably coupled to a file system 106, such as, for example, Windows® NTFS. The filter manager 104 can create frames (not shown) between one or more legacy filter order group(s) 108, to which altitudes associated with one or more minifilter(s) 110 can be mapped. An altitude can be, for example, a numeric value associated with a given minifilter. Altitudes associated with the minifilters 110 define the full order of a filter stack and leverage load-order, or legacy groups, to ensure that the order between the minifilters 110 and the legacy filters 108 relative to each other is maintained. This in turn facilitates complete ordering between the minifilters 110, which mitigates the inflexibility associated with traditional filter models.

The filter manager 104 permits integration of the benefits of the present invention while maintaining support for conventional filter models, which facilitates a smooth transition period during which conventional models can port over to the present filter management system. By allowing the filter manager 104 to attach to a volume more than once, the system 100 permits co-existence between the legacy filters 108 and the minifilters 110.

A legacy filter 108 has a "load order" group, whereas a minifilter 110 has an "altitude" that defines its load order group. The present invention defines altitude mappings for the load order group so that absolute order on a mixed-mode machine can be determined. For example, the following list represents some conventional load order groups in the order in which they should attach to a volume, top to bottom. This list is by no means exhaustive, and is presented for illustrative purposes only.

| FSFilter Activity Monitor | ActivityMonitor |
| FSFilter Undelete | Undelete |
| FSFilter Anti-Virus | AntiVirus |
| FSFilter Replication | Replication |
| FSFilter Continuous Backup | ContinuousBackup |
| FSFilter Content Screener | ContentScreener |
| FSFilter Quota Management | QuotaManagement |
| FSFilter Cluster File System | CFSMetaDataServer |
| FSFilter HSM | HSM |
| FSFilter Compression | Compression |
| FSFilter Encryption | Encryption |
| FSFilter Physical Quota Management | PhysicalQuotaManagement |
| FSFilter Open File | OpenFileBackup |
| FSFilter Security Enhancer | SecurityEnhancer |
| FSFilter Copy protection | CopyProtection |
| FSFilter Infrastructure | |

Load order groups guarantee that a filter in a load order group that is higher up in the order than another load order group will be loaded before a filter in the lower load order group. However, no order within the same group is guaranteed in conventional systems.

Start type is a parameter that can adversely affect load order for legacy filters 108. There are currently five different start types: Boot, System, Automatic, Manual, and Disabled. Unfortunately, if a higher-order filter has a start-type which is later than that of a lower-order filter, the attachment will be in the reverse order regardless of the load order group. For example, if a user buys an encryption filter having a "system" start type from a first vendor and an antivirus filter having a "boot" start type from a second vendor, then the antivirus filter will load and attach before the encryption filter. When input enters the stack, it will be encrypted before the antivirus filter can at upon it, thus rendering the antivirus filter useless. However, if the antivirus filter is a minifilter 110, it can load before the encryption filter and attach later, thus mitigating any problems associated with the order in which filters act upon input. Additionally, minifilters 110 will not be affected by start type or by load order groups in a legacy-free environment. Regardless of when a minifilter 110 loads, the minifilter 110 can attach at the right place in the stack.

According to another aspect of the invention, several assumptions can be followed to facilitate loading and/or unloading of minifilters 110 on a mixed-mode machine (e.g., a machine employing both legacy filters 108 and minifilters 110).

1.) Given that the minifilters are assigned load order groups, the assumption can be made that they will load at the right time with respect to other legacy filters e.g., if there are 3 filters, L1, M1, and L2 ($L_n$ represents a legacy filter, $M_n$: represents a minifilter), and the desired layering is defined by L1→M1→L2 (L1 is the highest filter), then the assumption is made that L1, M1, L2 are assigned distinct load order groups with corresponding ordering.
2.) The system utilizes the flexibility that the filter manager offers by continuing to honor ordering within a load group among minifilters (and minifilters alone), based on the altitude value. For example, if L1, M1, M2 belong to the same load order group, but Altitude(M1)>Altitude (M2), then M1 will be layered above M2.

3.) Legacy filters can dynamically load only at the top of the stack. Legacy filters cannot dynamically unload.

4.) A minifilter can undergo a dynamic unload/load sequence (or dynamic instance detach followed by attach of same instance). For example, if the minifilter is already loaded, it can be dynamically unloaded, and/or dynamically loaded. This allows minifilters to be updated dynamically without a reboot, which is of paramount importance in a no-reboot scenario.

The following discussion describes the manner in which minifilters 110 can be loaded on a mixed machine. A mixed machine comprises both legacy filters 108 and minifilters 110. Minifilters 110 that need to be at a specific location in a stack can supply a load order group, an information file (INF) specifying an automatic instance, and an altitude in the INF file. The filter manager 104 creates an instance at the specified load-order group altitude at filter load time. If such an automatic instance is not specified, assumption #4 above acts to reduce the probability of being able to dynamically create the instance again. By specifying automatic instances, minifilters 110 can ensure attachment to the stack.

To facilitate mixed mode ordering, a small change to the application programming interface (fore example, "(API) IoRegisterFsRegistrationChange( )", which is used in Longhorn, etc.) can be checked into the file system architecture (such as, for example, Microsoft's Longhorn build). This API allows filters to register for file system arrival/departures. The API for the IoRegisterFsRegistrationChange( ) command can "fail" adjacent registrations for the same driver to permit the file manager 104 to facilitate compatibility between legacy filters 108 and minifilters 110. This, in turn, permits a filter manager to register for file system notification for each minifilter 110 that registers. However, adjacent minifilters 110 (with no legacy filter in between) can be collapsed into the same filter manager instance, in which case the registration for file system notifications will fail. The change to the API ensures that adjacent registrations for file system notifications will fail.

Each instance of the filter manager 104 in the 'virtual' stack will be referred to as a 'frame' in this document. A frame is an instance of a filter manager global state that can manage minifilters at that attachment order in the stack. The global state for the filter manager is split into a per-frame state to facilitate grouping of minifilters within a frame.

Figure 2:
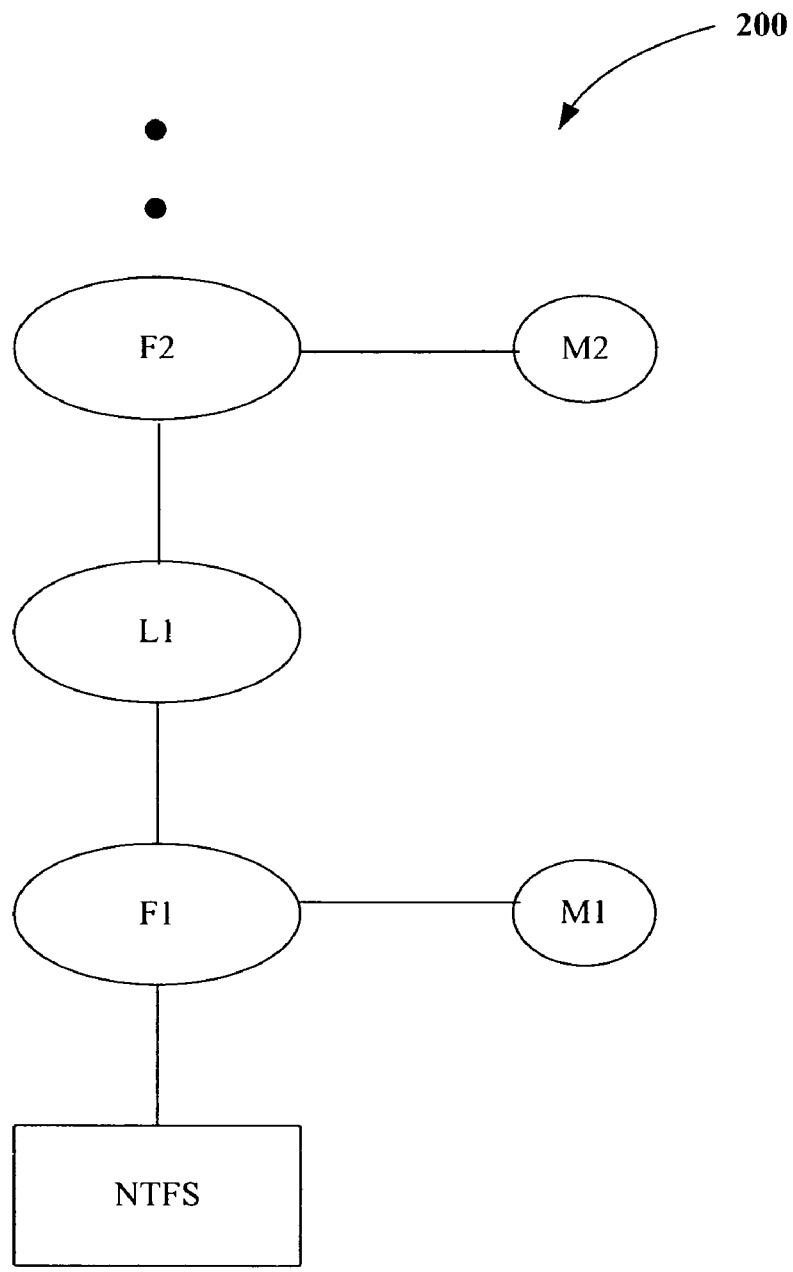
FIG. 2 is an illustration of a system in accordance with an aspect of the present invention, wherein minifilters are mapped according to an extant legacy filter structure.

FIG. 2 illustrates a system 200 in accordance with an aspect of the invention, in which there is one frame for each minifilter and the minifilters are interleaved with legacy filters. For example:

$$M_1 \rightarrow L_1 \rightarrow M_2$$

where $M_n$ is a minifilter, $L_n$ is a legacy filter and arrows represent attachment ($M_2$ being at the top of the stack), which will result in the following stack:

$$F_1 \rightarrow L_1 \rightarrow F_2$$

where $F_n$ is a filter manager frame. As illustrated in FIG. 2, a frame F2 is assigned for minifilter M2 above the legacy filter L1. Frame F1 comprises M1, and is located below the legacy filter L1. The first frame to attach (F1) is stacked directly upon the base file system, which, according to this example, is NTFS. Thus, the order of attachment represented by $F_1 \rightarrow L_1 \rightarrow F_2$ dictates the ultimate frame stack order.

Figure 3:
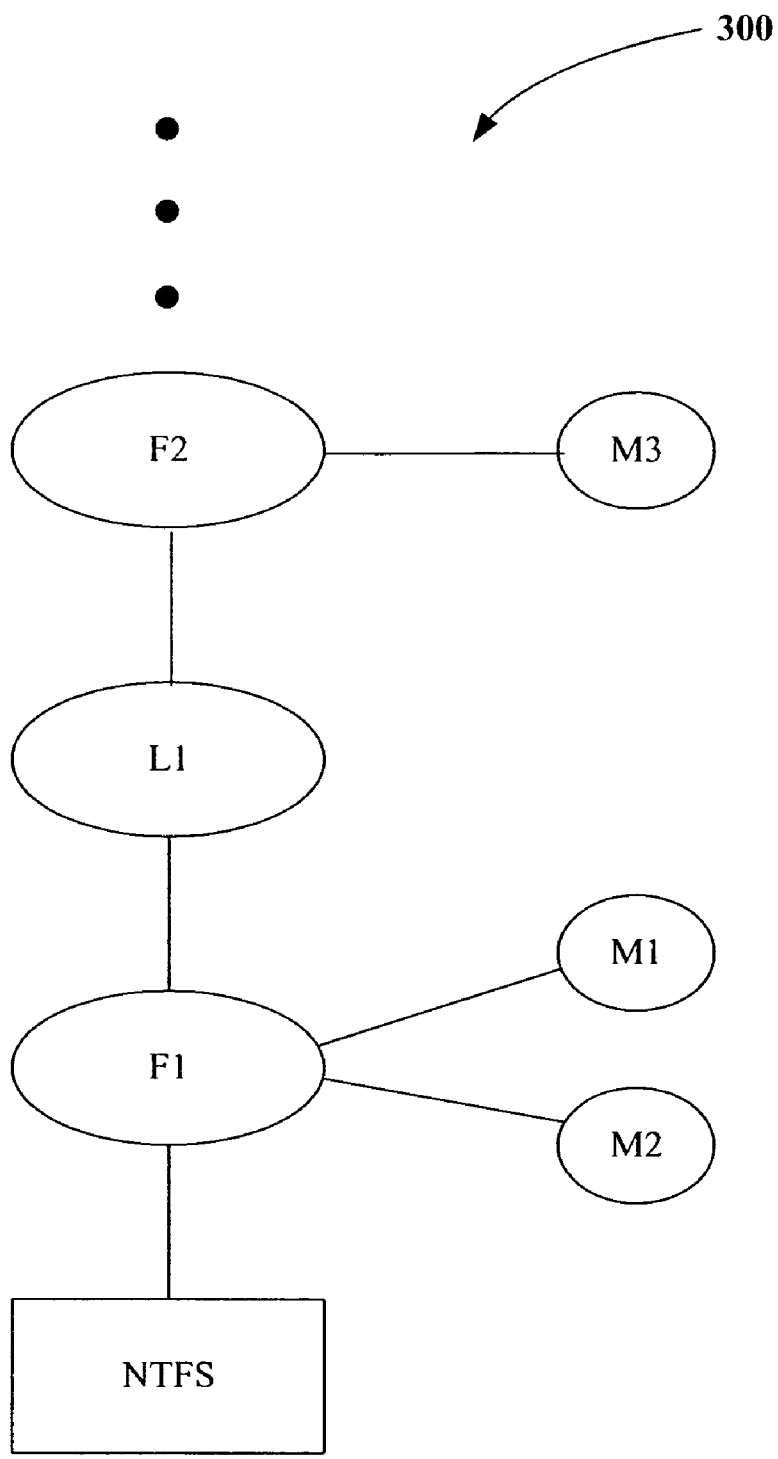
FIG. 3 is an illustration of a system in accordance with an aspect of the present invention, wherein multiple minifilters occupy the same frame.

FIG. 3 illustrates a system 300 according to a related aspect of the invention, in which a single frame can comprise multiple minifilters. The minifilters M1, M2, and M3 represented in FIG. 3 are associated with, by way of example, altitudes having values such that $$M2<M1<M3$$

Furthermore, FIG. 3 illustrates a legacy filter such that the desired stacking order of the filters is represented by $$M2 \rightarrow M1 \rightarrow L1 \rightarrow M3$$

In this example, frame F1 attaches to the base file system (here, NTFS) and manages both minifilter M1 and minifilter M2. It is important to note that within frame F1, minifilter M1 is stacked above minifilter M2, as required by their respective altitudes. Legacy filter L1 is stacked above frame F1, and below frame F2, which manages minifilter M3. As illustrated in FIG. 2, the attachment order of the frames determines the stack order. However, in the present example, the order in which minifilters M1 and M2 load and/or attach is irrelevant because their respective order within frame F1 is governed by their respective altitudes.

Figure 4:
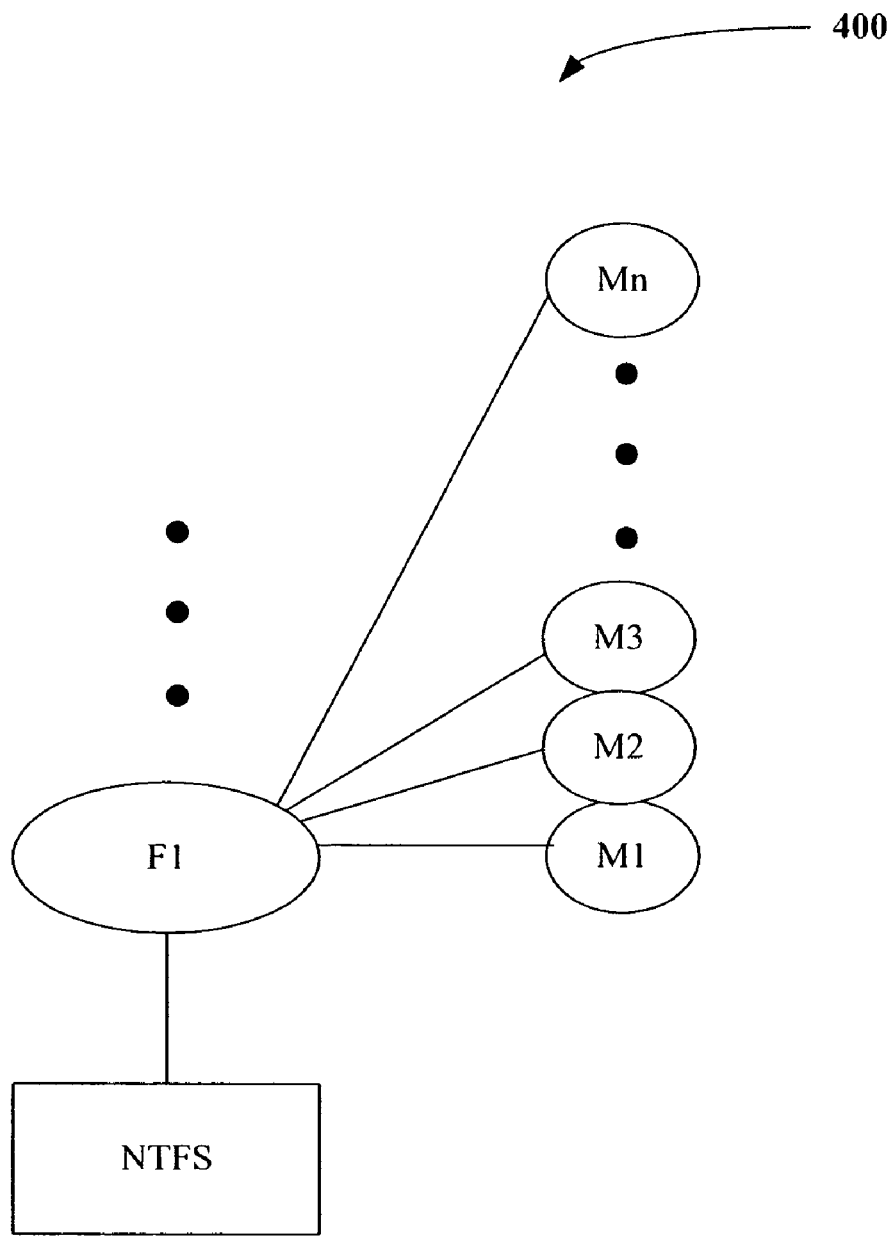
FIG. 4 is an illustration of a system in accordance with an aspect of the present invention, wherein minifilters are arranged in a legacy-free environment.

FIG. 4 is an illustration of a system 400 in accordance with an aspect of the invention in which a legacy-free environment is exemplified. For example, a plurality of minifilters, M1, M2, M3, . . . , Mn are represented in the absence of any legacy filter. The respective altitudes of the minifilters can be described as $$M_1<M_2<M_3 \ldots <M_n$$

for the sake of simplifying the present example. The altitudes, then, delineate the stacking (e.g., attachment) order of the minifilters, such that $$M_1 \rightarrow M_2 \rightarrow M_3 \ldots \rightarrow M_n$$

in the legacy-free environment. All of the minifilters can be comprised by a single filter manager frame because there is no legacy filter present. According to this example, the order in which the minifilters load and/or attach has no bearing on the order in which they stack, which is a product of their respective altitudes. Furthermore, all of the minifilters can be "collapsed" into frame F1 precisely because their respective altitudes will ensure that proper stacking order is maintained between the minifilters, and, thus, will ensure that input and/or output passing through the stack will be operated upon accordingly.

While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The following discussion is presented to describe the manner in which minifilters can be associated with frames. For each frame i, the filter manager maintains a non-overlapping closed interval $[L_i, H_i]$ of the altitudes currently spanned by the frame, where every minifilter's altitude within the frame i is guaranteed $>Li$ and $\leq Hi$. This altitude interval can be adjusted as appropriate when a minifilter loads as outlined in the algorithm below. However, since a filter manager never unloads, the intervals need not become narrower for a given frame, thereby ensuring that a minifilter that dynamically unloads and reloads will relocate to the same frame.

To determine the interval of a frame, each minifilter can be assigned a default altitude. Even though filters can support multiple instances, one altitude can be chosen as a 'default', which can be used to determine the frame to which the filter belongs. According to one aspect of the algorithm, for instance, the lowest altitude among all the specified instances can be chosen as the 'default' altitude.

The filter manager can also maintain the frames in a linked list that can be ordered head to tail from lowest to highest in the stack. The altitude intervals for each frame can be closed and non-overlapping.

The algorithm obeys the following principles:
1.) Filters can be loaded based on load order or dynamically whenever needed. The algorithm is the same whether the minifilter is loaded during boot or is loaded dynamically at a later junction.
2.) When a minifilter is loaded, it can call the API FltRegisterFilter( ), for example, (from it's DriverEntry( )) if it is interested in proper ordering with respect to legacy filters.
   2.1) The minifilters default altitude, X, is determined.
   2.2) The list of frames is scanned head to tail to find an altitude interval [L, H] such that: (L<X≦H). If such a frame is found, the minifilter can be inserted in that filter manager frame, and the FILTER object for the minifilter can be updated to point to the frame.
   2.3) If no such frame pair is found, a new frame can be created and entered in the tail of the linked list of frames: this frame can be pre-allocated since the call to IoRegisterFsRegistrationChange( ) has a high probability of success, and notifications within the span of the call can be initiated before it returns.
   2.4) Filter manager can issue IoRegisterFsRegistrationChange( ) to register for file system notifications.
   2.5) If IoRegisterFsRegistrationChange( ) succeeds, then the new frame was needed and the minifilter's FILTER object will be updated to point to the filter manager frame. The frame interval can then be initialized to [H, X], where H is the previous frame's high altitude. If this is the first frame, H=0: X is always >0.
   2.6) If IoRegisterFsRegistrationChange( ) fails, then the minifilter can be collapsed to the topmost frame. The newly allocated frame can be removed from the tail of the list and freed. The interval can be extracted from the topmost frame (e.g. the frame at the tail of the list) [L, H]. By definition (X>H) holds true. Next, the minifilter can be inserted at this frame, and the interval can be adjusted to [H, X].
3.) When the filter manager's file system notification routine is called, it creates a device object and attaches to the passed-in file system device object. The frame to which the device object corresponds can be recorded, which facilitates management of the proper state when mounts come down the stack. To determine the correct filter manager frame, the system can simply "walk down" the device stack using existing I/O APIs (e.g., IoGetAttachedDevice( ), IoGetLowerDeviceObject( ), etc.), and count all filter manager device objects already in the stack, wherein each such device object represents one frame. If the count is represented by the integer N, the frame list can be walked from head to tail with a counter initialized to N and decremented for every node. When the count reaches zero, the current node (e.g., the node associated with the zero count value) will be the frame that corresponds to the attachment of filter manager and is necessarily a non-null frame. Subsequently, the device extension can be updated to point to this frame.

Once a frame is established, it will not be removed. This is so because frames represent attachments of a legacy filter, or frame manager. When a minifilter unloads, the interval at which it was loaded can remain unadjusted, so that when the minifilter reloads, it can be reloaded at the same frame, as set forth above in 2.2.

Figure 5:
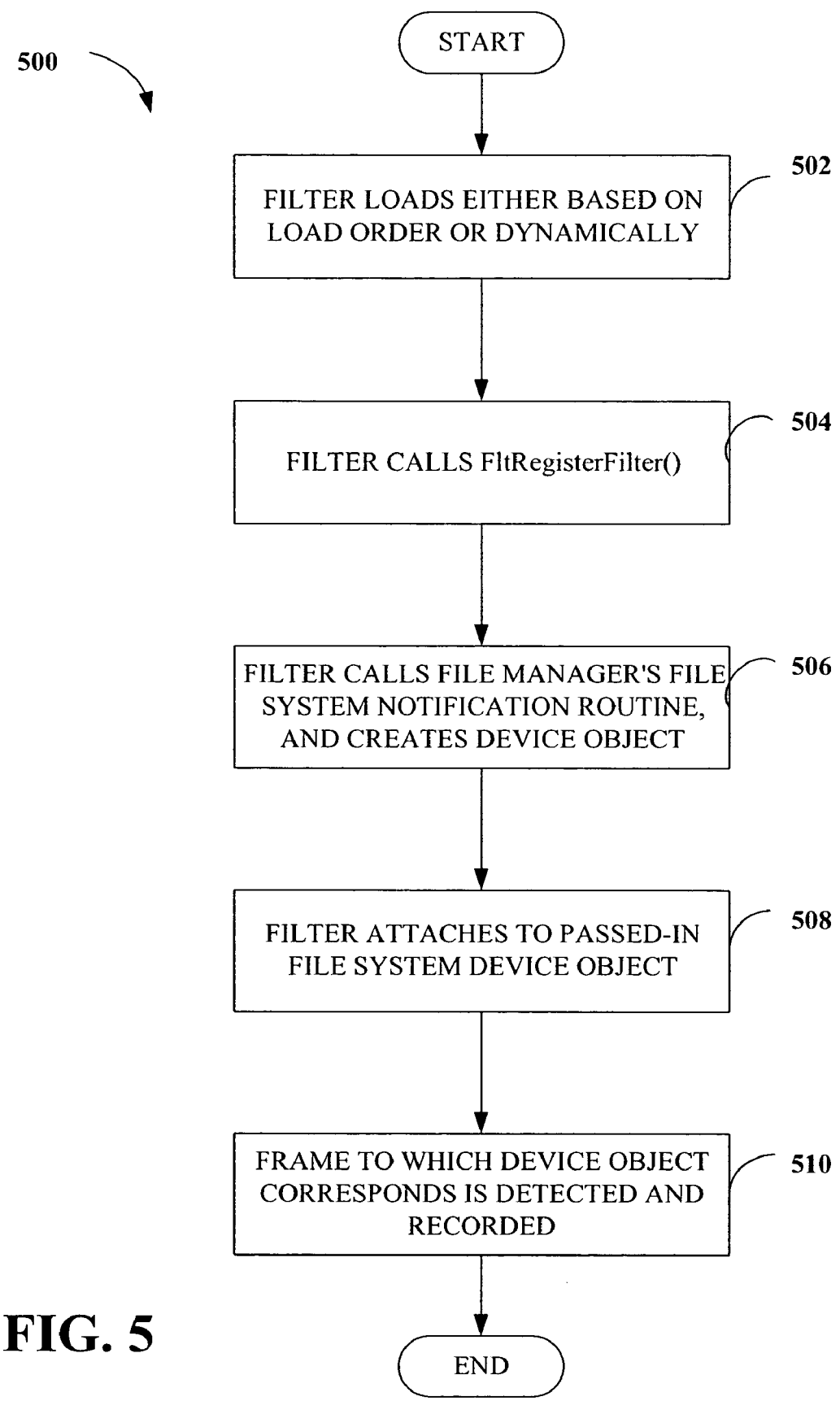
FIG. 5 is an illustration of a methodology in accordance with an aspect of the present invention.

FIG. 5 illustrates a methodology in accordance with an aspect of the present invention. At 502, a filter loads to a stack. In the case of a legacy filter, loading occurs subject to the constraints of the load order associated with the filter. If the filter is a minifilter, it can load dynamically according to an assigned altitude that is mapped to legacy filter order group(s). Upon loading, the filter calls FltRegisterFilter( ) at 504. At 506, the filter calls the file manager's file system notification routine and proceeds to create a device object. At 508, the filter manager attaches to a passed-in device object. Finally, at 510, the frame to which the filter's device object corresponds is detected and recorded.

Figure 6:
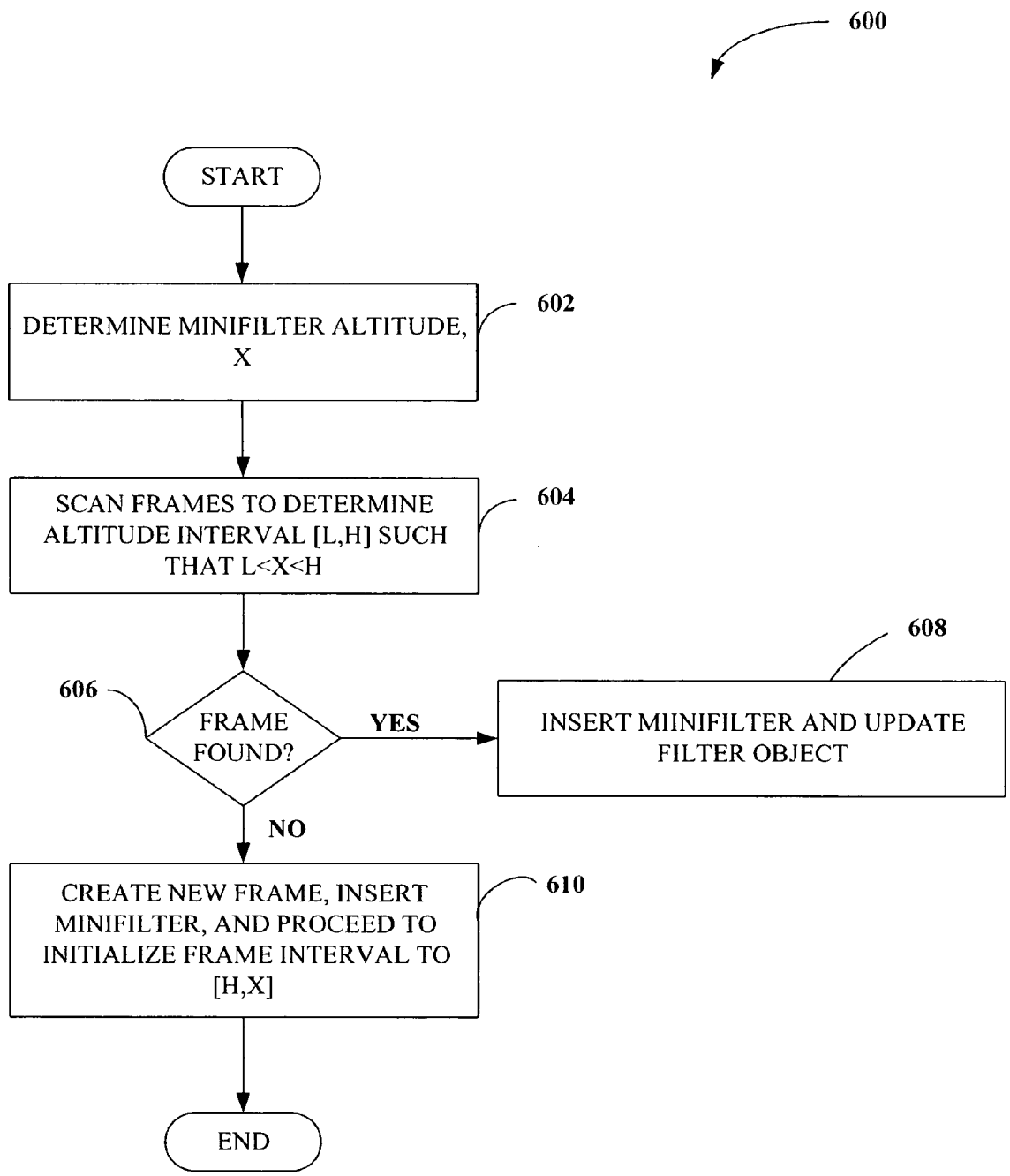
FIG. 6 is an illustration of a methodology in accordance with an aspect of the present invention.

FIG. 6 illustrates a methodology in accordance with an aspect of the present invention. Initially, a minifilter's altitude, X, is determined at 602. The frames of a stack are then scanned to determine an altitude interval, [L, H], such that L<X<=H at 604. At 606, the system assesses whether or not such a frame was found. If a frame satisfying the above requirements was found, then the method proceeds to 608, where the minifilter is inserted into the frame and the filter object associated therewith is updated. If no such frames are found at 612, then at 616, a new frame is created, the minifilter is inserted therein, and the new frame interval is initialized to [H, X] where H is the high altitude of the previous frame.

Figure 7:
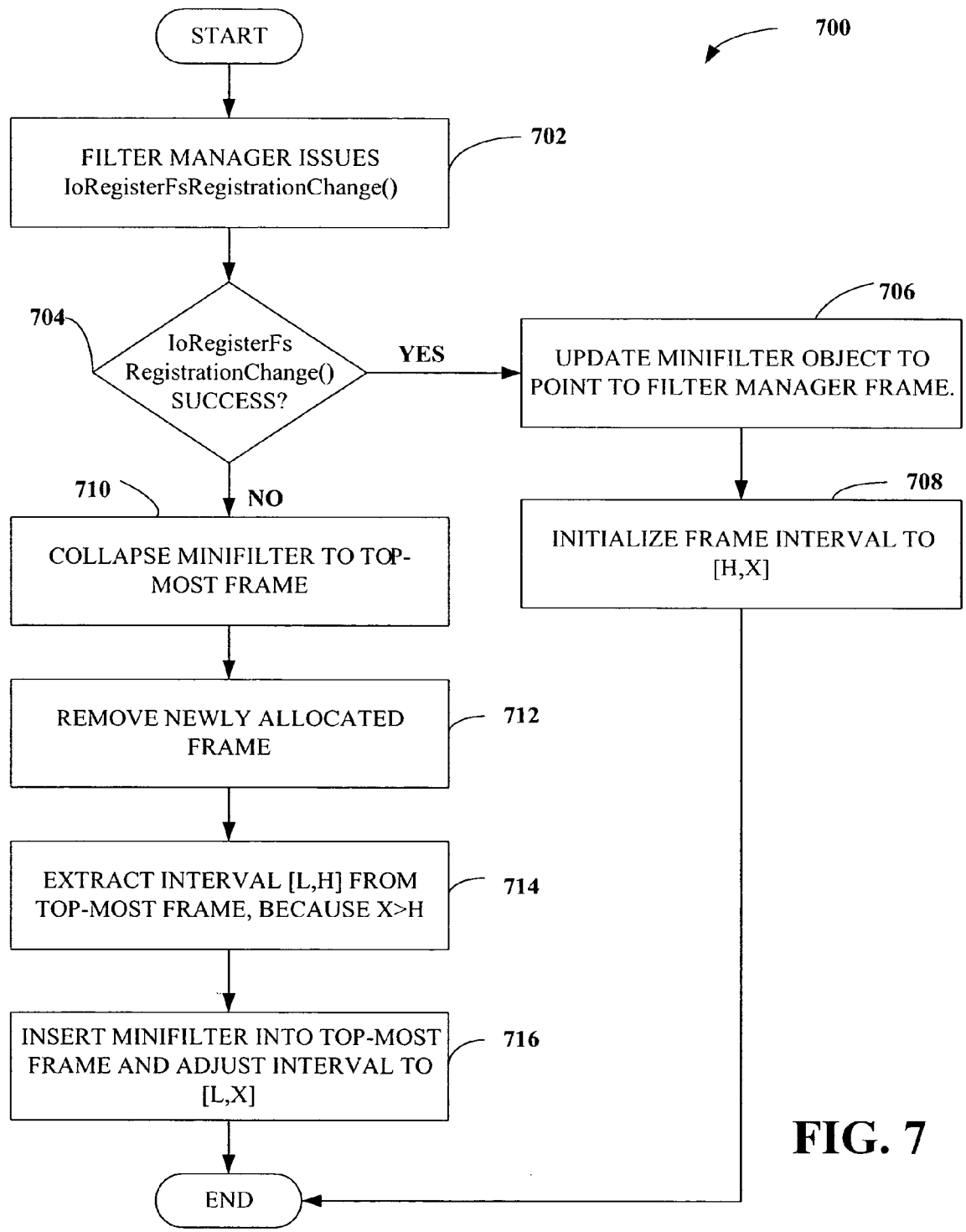
FIG. 7 is an illustration of a methodology in accordance with an aspect of the present invention.

FIG. 7 is an illustration of a methodology in accordance with an aspect of the present invention. A Filter manager issues an IoRegisterFsRegistrationChange( ) request at 702. At 704, an inquiry is made as to the success of the IoRegisterFsRegistrationChange( ) request. If the request was successful, then at 706 the minifilter object is updated to point to the filter manager frame. At 708, the frame interval is initialized to the interval [H, X], where H is the previous frame's altitude. If it is determined at 04 that the request was not successful, then the minifilter is collapsed to the top-most frame at 710. The newly allocated frame is removed at 712, as it is no longer necessary. At 714, the interval [L, H] is extracted from the top-most frame, because X>H. At 716, the minifilter is inserted into the top-most frame, and the frame interval is adjusted to [L, X].

The subject invention (e.g., in connection with minifilter ordering) can employ various artificial intelligence based schemes for carrying out various aspects of the subject invention. For example, a process for determining when a minifilter will be loaded or where it will be mapped based on a particular legacy filter structure can be facilitated via an automatic classification system and process. A classifier is a function that maps an input attribute vector, x=(x1, x2, x3, x4, xn), to a confidence that the input belongs to a class, that is, f(x) =confidence(class). Such classification can employ a probabilistic and/or statistical-based analysis (e.g., factoring into the analysis utilities and costs) to prognose or infer an action that a user desires to be automatically performed. In the case of minifilters, for example, attributes can be numerical values or other data-specific attributes derived from the words (e.g., altitudes), and the classes can be load order groups (e.g., levels of priorities).

For example, a support vector machine (SVM) classifier can be employed. An SVM operates by finding a hypersurface in the space of possible inputs. This hypersurface will attempt to split the triggering criteria from the non-triggering events. Intuitively, this makes the classification correct for testing data that is near, but not identical to the training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, the classifier(s) can be used to automatically determine according to a predetermined criteria when and where a minifilter loads, unloads, reloads, attaches, etc. The criteria can include, but is not limited to, minifilter altitude, adjacent filter(s), adjacent filter function(s), etc.

Figure 8:
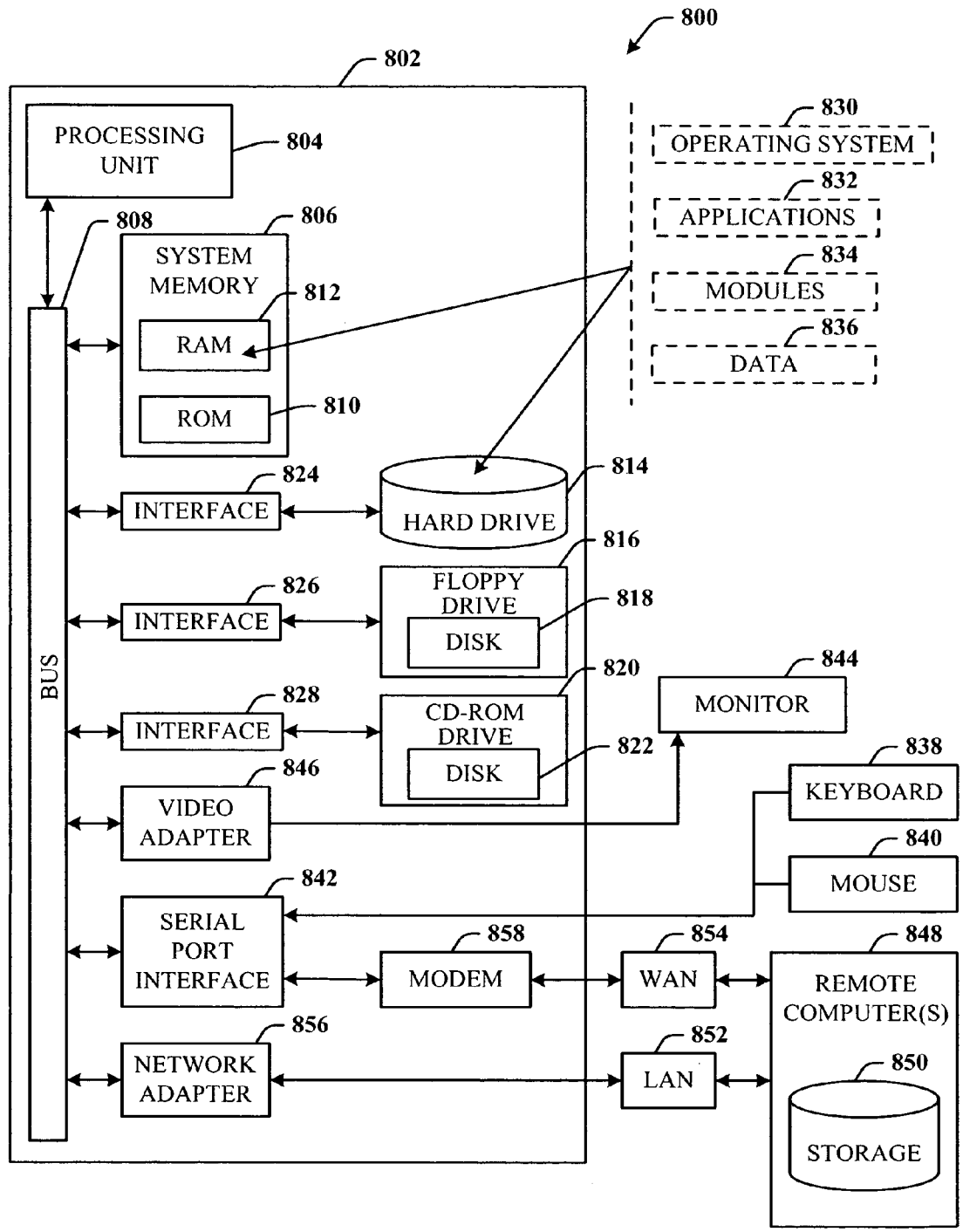
FIGS. 8 and 9 are illustrations of exemplary computing environments in accordance with an aspect of the present invention.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 8, there is illustrated an exemplary environment 800 for implementing various aspects of the invention includes a computer 802, the computer 802 including a processing unit 804, a system memory 806 and a system bus 808. The system bus 808 couples system components including, but not limited to, the system memory 806 to the processing unit 804. The processing unit 804 may be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up.

The computer 802 further includes a hard disk drive 814, a magnetic disk drive 816, (e.g., to read from or write to a removable disk 818) and an optical disk drive 820, (e.g., reading a CD-ROM disk 822 or to read from or write to other high capacity optical media such as Digital Video Disk (DVD)). The hard disk drive 814, magnetic disk drive 816 and optical disk drive 820 can be connected to the system bus 808 by a hard disk drive interface 824, a magnetic disk drive interface 826 and an optical drive interface 828, respectively. The drives and their associated computer-readable media provide nonvolatile storage of data, data structures, computer-executable instructions, and so forth. For the computer 802, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 812, including an operating system 830, one or more application programs 832, other program modules 834 and program data 836. It is appreciated that the present invention can be implemented with various commercially available operating systems or combinations of operating systems.

A user can enter commands and information into the computer 802 through a keyboard 838 and a pointing device, such as a mouse 840. Other input devices (not shown) may include a microphone, an IR remote control, a joystick, a game pad, a satellite dish, a scanner, or the like. These and other input devices are often connected to the processing unit 804 through a serial port interface 842 that is coupled to the system bus 808, but may be connected by other interfaces, such as a parallel port, a game port, a universal serial bus ("USB"), an IR interface, etc. A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 may be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include a local area network (LAN) 852 and a wide area network (WAN) 854. Such networking environments are commonplace in offices, enterprise-wide computer networks, intranets and the Internet.

When used in a LAN networking environment, the computer 802 is connected to the local network 852 through a wired or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 typically includes a modem 858, or is connected to a communications server on the LAN, or has other means for establishing communications over the WAN 854, such as the Internet. The modem 858, which may be internal or external and a wired or wireless device, is connected to the system bus 808 via the serial port interface 842. In a networked environment, program modules depicted relative to the computer 802, or portions thereof, may be stored in the remote memory storage device 850. It will be appreciated that the network connections shown are exemplary and other means of establishing a communications link between the computers may be used.

The computer 802 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 802 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 9:
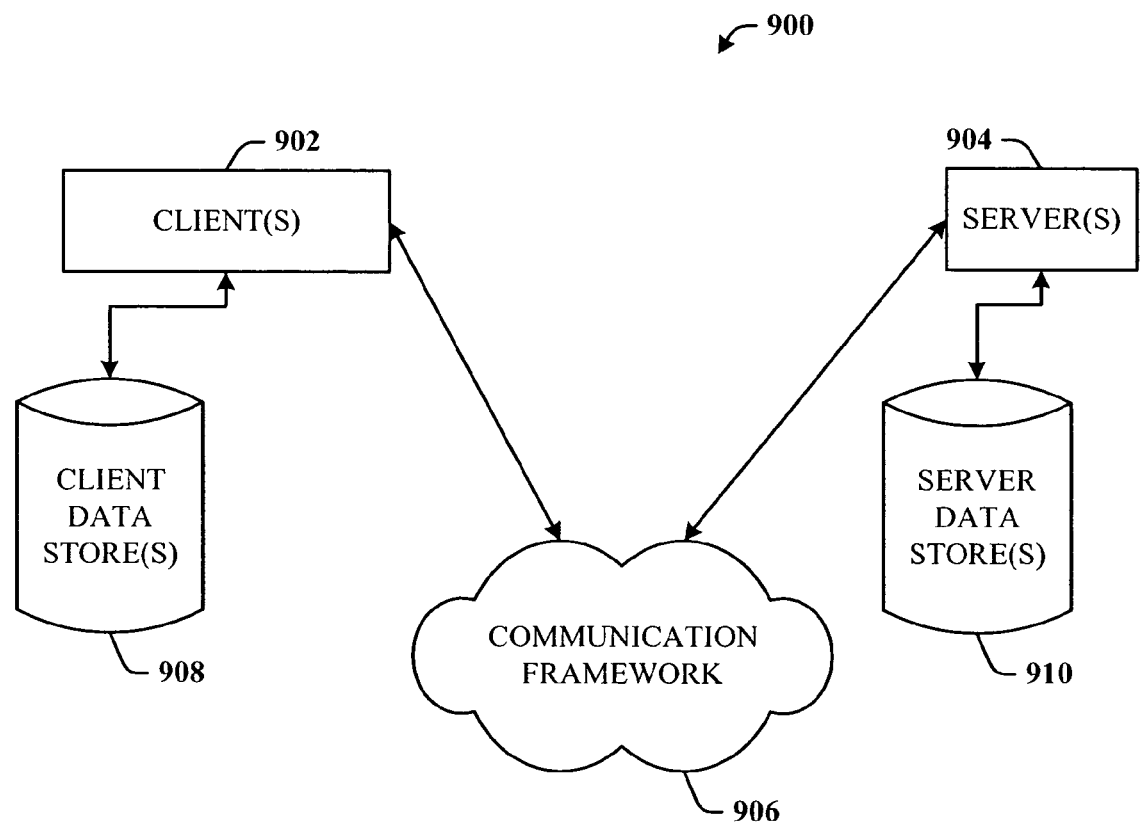

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices).

The servers 904 can house threads to perform transformations by employing the present invention, for example. One possible communication between a client 902 and a server 904 may be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications may be facilitated via a wired (including optical fiber) and/or wireless technology. The client(s) 902 are operably connected to one or more client data store(s) 908 that can be employed to store information local to the client(s) 902 (e.g., cookie(s) and/or associated contextual information). Similarly, the server(s) 904 are operably connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. At least one computer-readable storage medium having instructions recorded thereon which, when executed, perform a method of managing a file system filter, the method comprising:

identifying an integer altitude value of a minifilter;

mapping an altitude, defined by the integer altitude value, of the minifilter to one of a plurality of legacy filter order groups, the mapping comprising:

determining an altitude range associated with at least a portion of the legacy filter order groups, determining whether any altitude range of a legacy filter order group encompasses the integer altitude value of the minifilter;

if an altitude range of a legacy filter order group encompasses the integer altitude value of the minifilter, then inserting the minifilter into the legacy filter order group; and if no altitude range of a legacy filter order group encompasses the integer altitude value of the minifilter, then creating a new filter order group and inserting the minifilter into the new filter order group.

2. The at least one computer-readable storage medium of claim 1, wherein multiple instances of the filter manager attach to a file system stack.

3. The system at least one computer-readable storage medium of claim 2, wherein each instance of the filter manager is associated with a unique interval of altitude values.

4. The at least one computer-readable storage medium of claim 1, wherein the minifilter is coded to permit dynamic loading and/or unloading to a filter stack.

5. The at least one computer-readable storage medium of claim 4, wherein the altitude of the minifilter ensures that the minifilter, if unloaded, will reload to its previous position in the filter stack.

6. The at least one computer-readable storage medium of claim 1, further comprising instructions defining dynamically associating the minifilter with at least one frame.

7. The at least one computer-readable storage medium of claim 6, wherein a numerical interval is associated with each frame.

8. A computer operable to manage a file system filter, the computer comprising at least one processor programmed to:
   load a minifilter to a file system, the file system comprising at least one filter manager frame; and
   determine an integer altitude value associated with the minifilter;
   determine an altitude range [L, H] associated with each at least one filter manager frame, wherein L is the lower boundary value of the altitude range and H is the upper boundary value of the altitude range;
   determine whether any altitude range associated with the at least one filter manager frame encompasses the integer altitude value associated with the minifilter;
   if an altitude range associated with a filter manager frame encompasses the integer altitude value associated with the minifilter, such that L<x<H where X is the altitude of the minifilter, then insert the minifilter into the filter manager frame; and
   if no altitude range associated with a filter manager frame encompasses the integer altitude value associated with the minifilter, then:
      determine a lower altitude range $[L_1, H_1]$ and a higher altitude range $[L_2, H_2]$ closest to the integer altitude value X, such that X is greater than the upper boundary value of the lower altitude range $H_1$ and less than the lower boundary value of the higher altitude range $L_2$;
      insert the minifilter into the filter manager frame having the higher altitude range; and
      adjust the higher altitude range to $[X, H_2]$.

9. The computer of claim 8, wherein the at least one processor is further programmed to update a filter object associated with the minifilter to point to the filter manager frame into which the minifilter has been inserted.

10. The computer of claim 8, wherein the at least one processor is further programmed to:
    initialize a filter object associated with the minifilter to point to the filter manager frame into which the at least one minifilter has been inserted.

11. The computer of claim 8, wherein the at least one processor is further programmed to, if no lower or higher altitude range is determined to be closest to the integer value X, then create a new filter manager frame and arranging the new filter manager frame at the top of the file system stack.

12. The computer of claim 11, wherein the at least one processor is further programmed to pre-allocate the new filter manager frame for management of the minifilter.

13. The computer of claim 12, wherein the at least one processor is further programmed to call the filter manager's file system notification routine to submit a request to register for file system notifications.

14. The computer of claim 13, wherein the at least one processor is further programmed to, if the request to register is successful:
    insert the minifilter into the new frame;
    initialize the filter manager frame altitude range upper and lower boundary values to the altitude value of the minifilter such that the altitude range is [H, X]; and
    update a filter object associated with the minifilter to point to the new frame.

15. The computer of claim 13, wherein the at least one processor is further programmed to, if the request to register is unsuccessful:
    remove the new frame from the filter stack;
    extract the altitude interval from the next lower, now top-most, frame in the stack;
    collapse the at least one minifilter into the top-most frame; and
    adjust the frame interval so that the upper boundary value is set equal to the value of the altitude of the at least one minifilter, such that the adjusted interval is [L, X].

16. The computer of claim 13, wherein the at least one processor is further programmed to determine the identity of a frame calling into the file system notification routine.

17. The computer of claim 16, wherein the at least one processor is programmed to determine the identity of the frame by counting the number of all filter manager device objects, N, already in the stack, from top to bottom, using existing application programming interfaces, and wherein each device object represents a frame.

18. The computer of claim 17, wherein the at least one processor is further programmed to initialize a counter to N and decrementing the counter for every node encountered from the bottom to the top of the stack.

19. The computer of claim 18, wherein a zero value in the counter represents the position of the frame that corresponds to the attachment of the filter manager.

* * * * *